Figure 2:
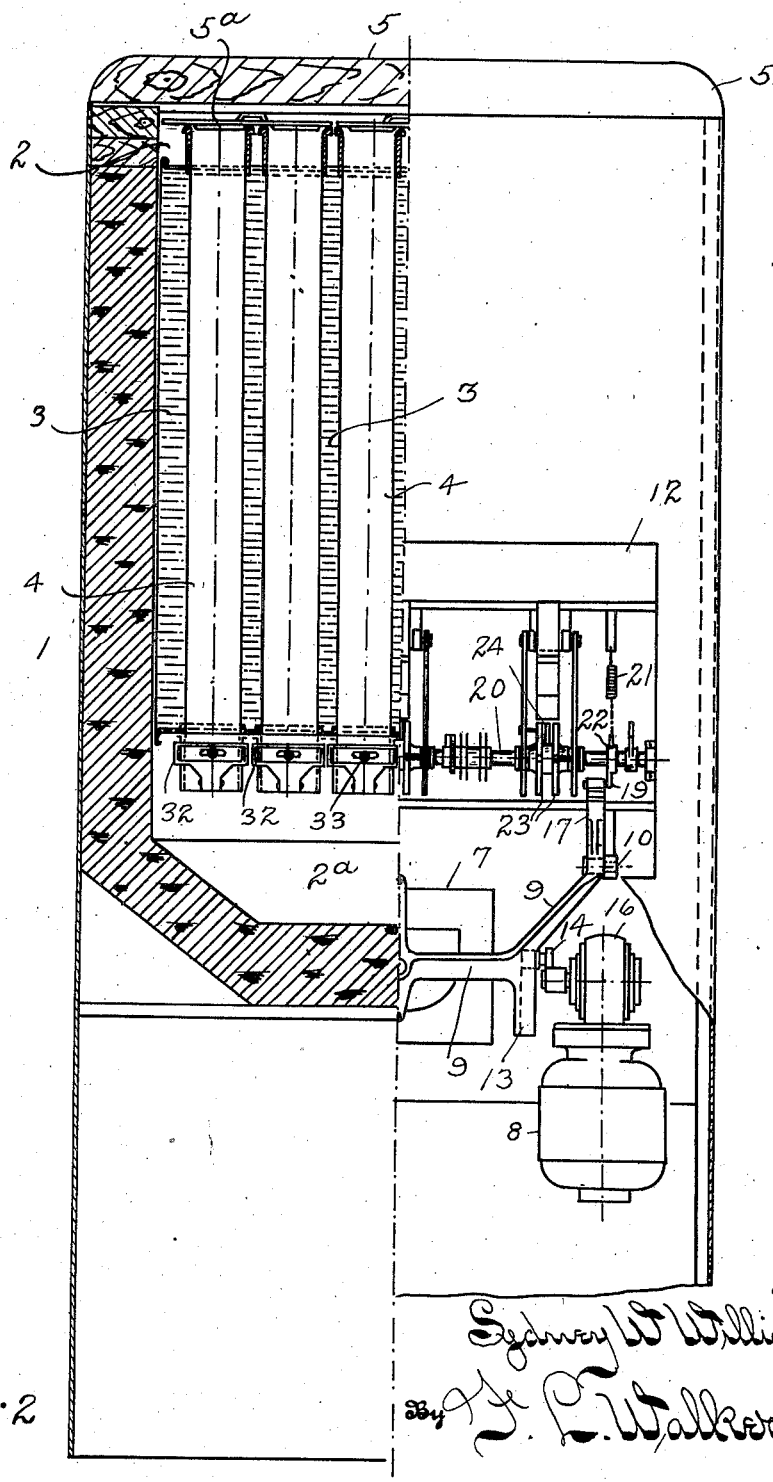

May 4, 1937.　　　　　S. W. WILLIAMSON　　　　　2,078,984
PACKAGE DISPENSING APPARATUS
Filed Jan. 21, 1932　　　11 Sheets-Sheet 1
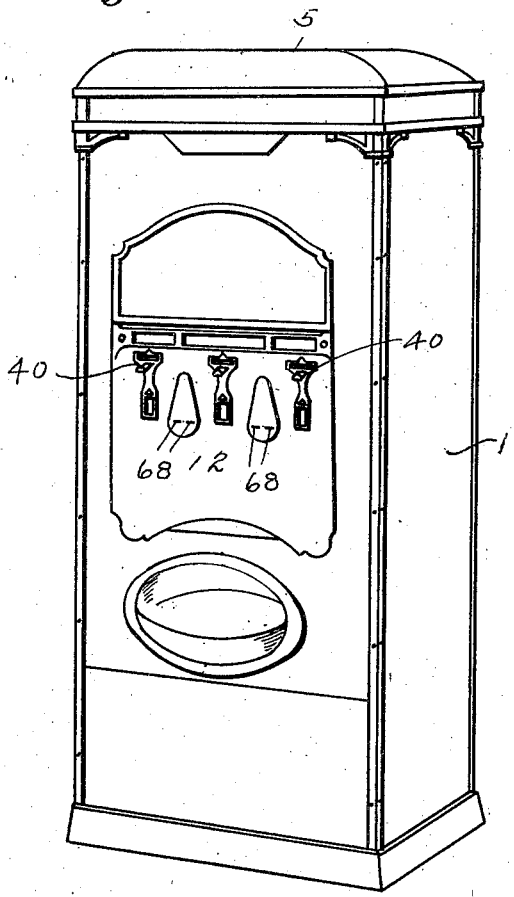
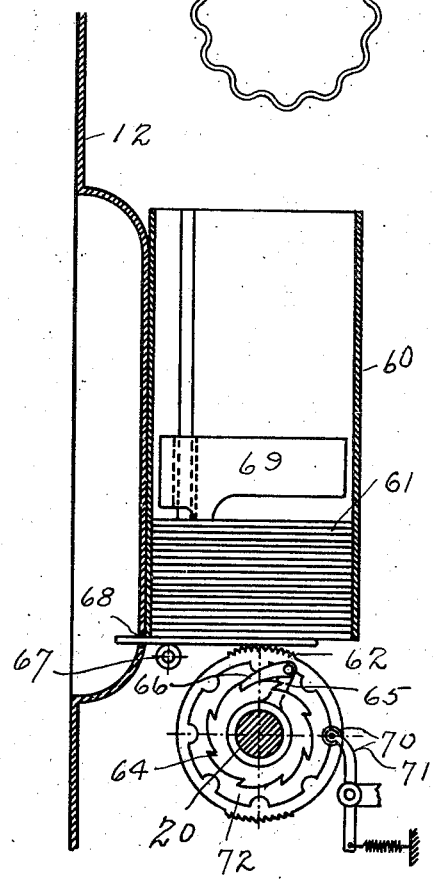
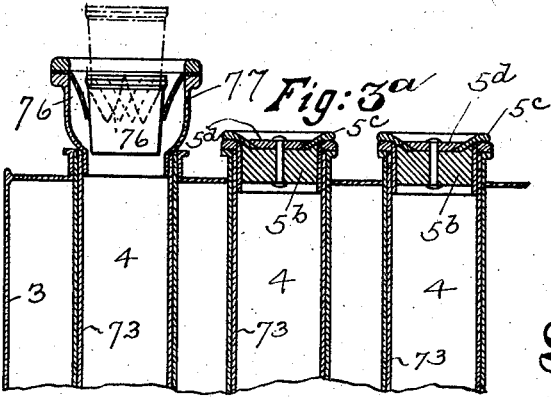
Inventor
Sydney W. Williamson
By L. L. Walker
Attorney May 4, 1937.  S. W. WILLIAMSON  2,078,984
PACKAGE DISPENSING APPARATUS
Filed Jan. 21, 1932   11 Sheets-Sheet 4

Inventor
Sydney W. Williamson
By F. L. Walker
Attorney

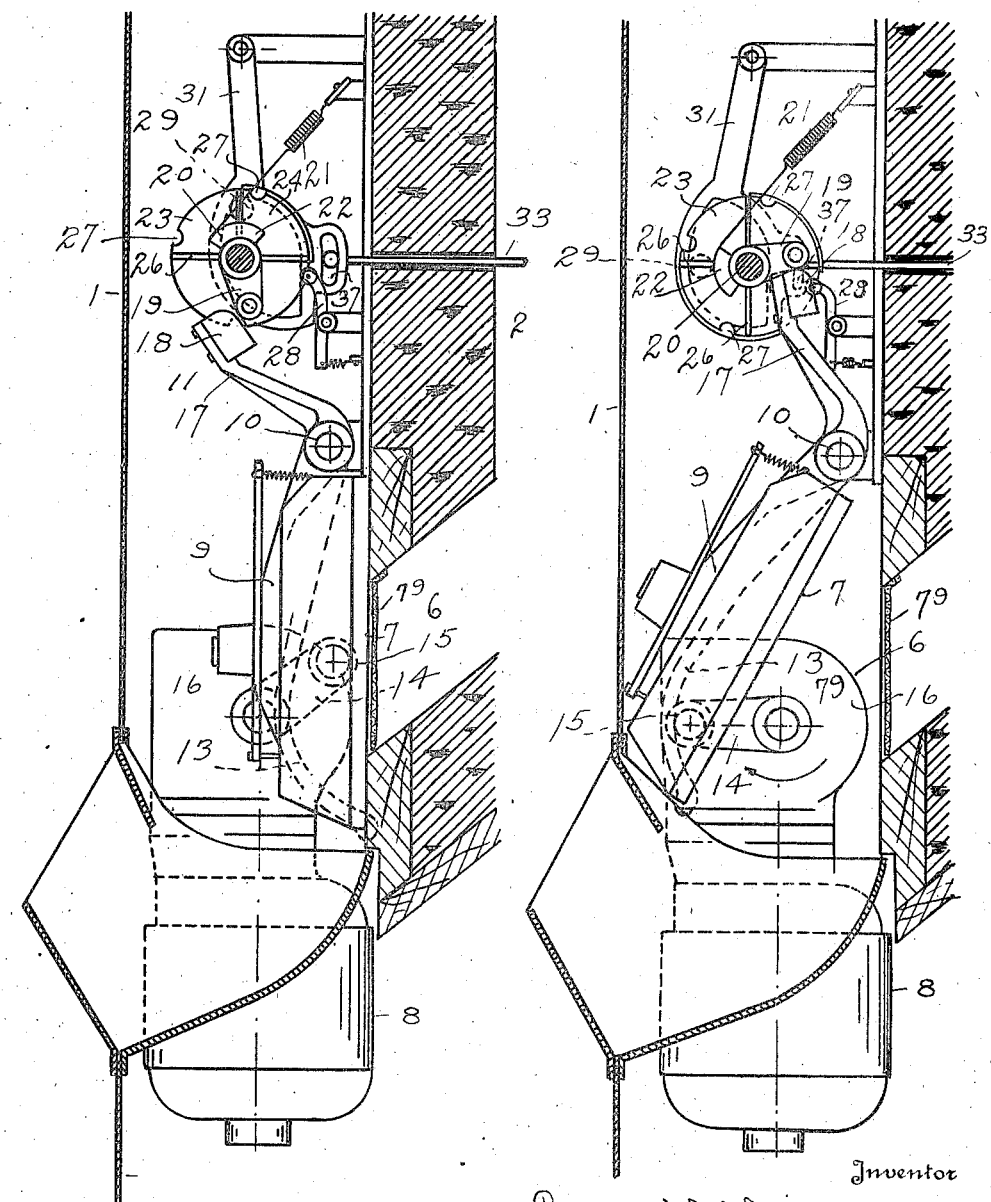

May 4, 1937.  S. W. WILLIAMSON  2,078,984
PACKAGE DISPENSING APPARATUS
Filed Jan. 21, 1932  11 Sheets-Sheet 6
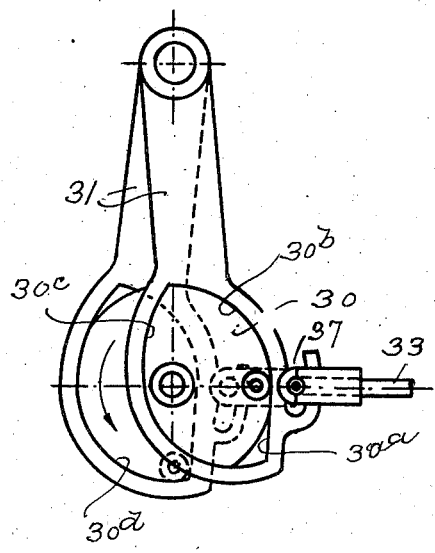
Fig: 7
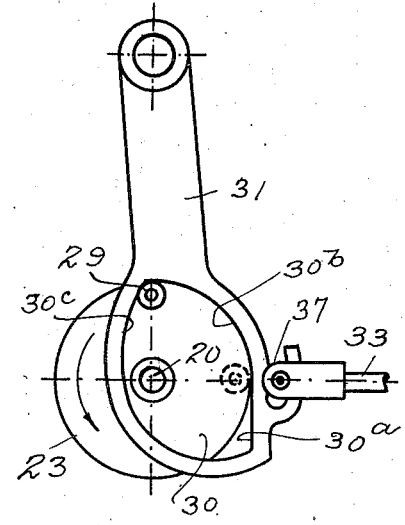
Fig: 8
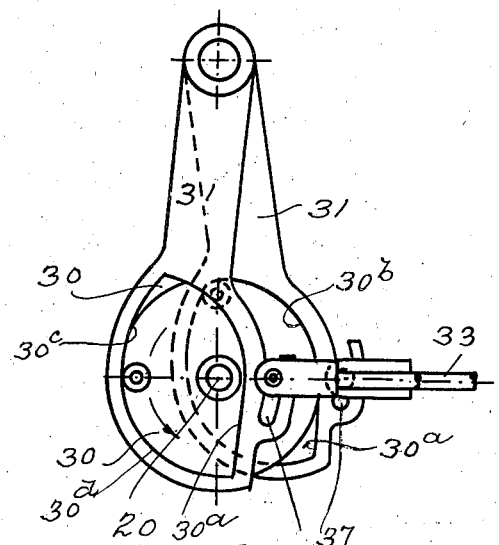
Fig: 9
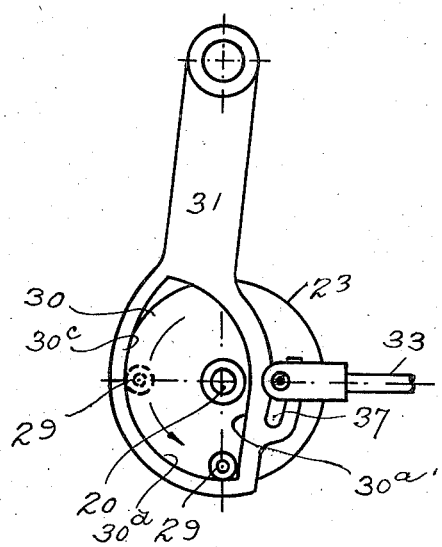
Fig: 10
INVENTOR
Sydney W. Williamson
BY
J. L. Walker ATTORNEY

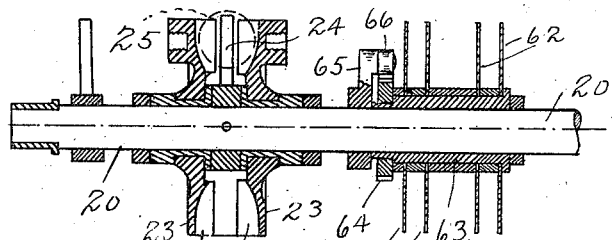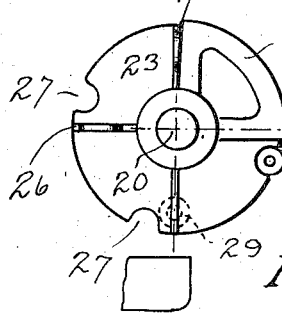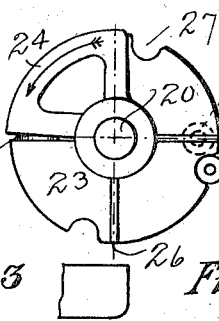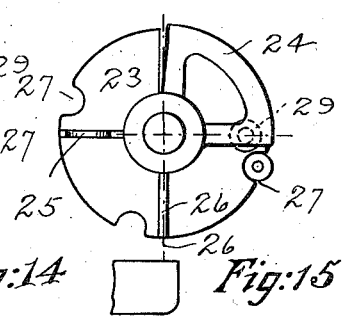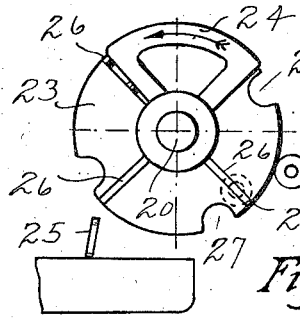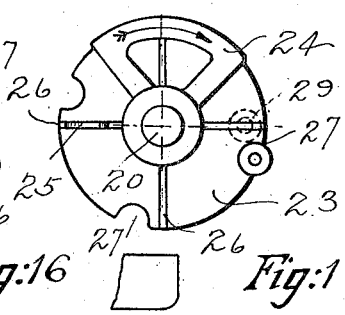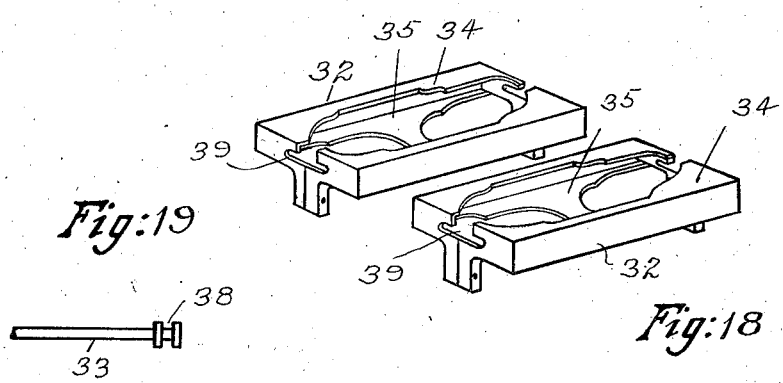

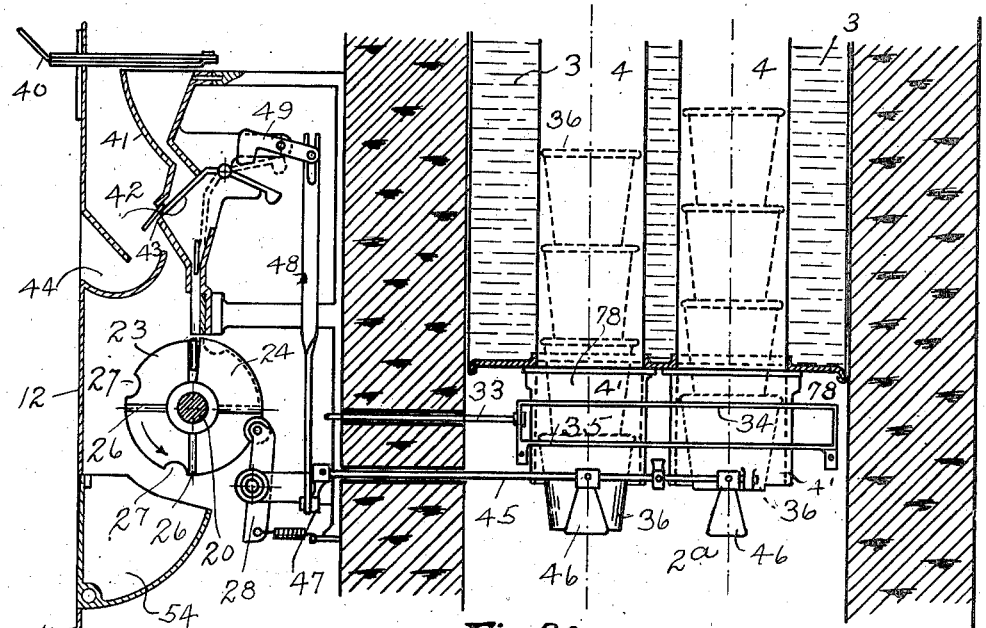
Fig:20
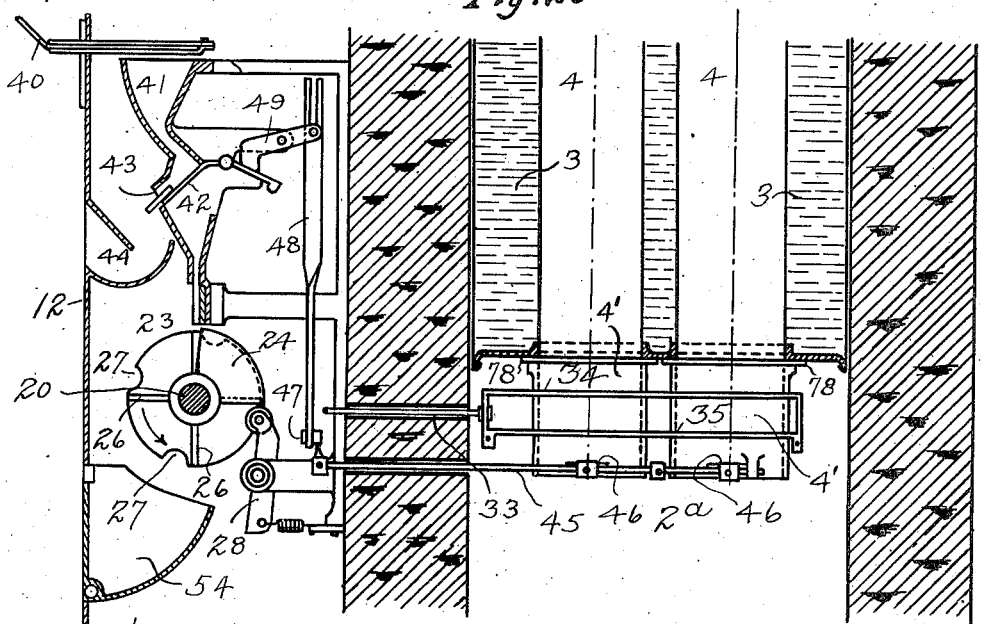
Fig:21

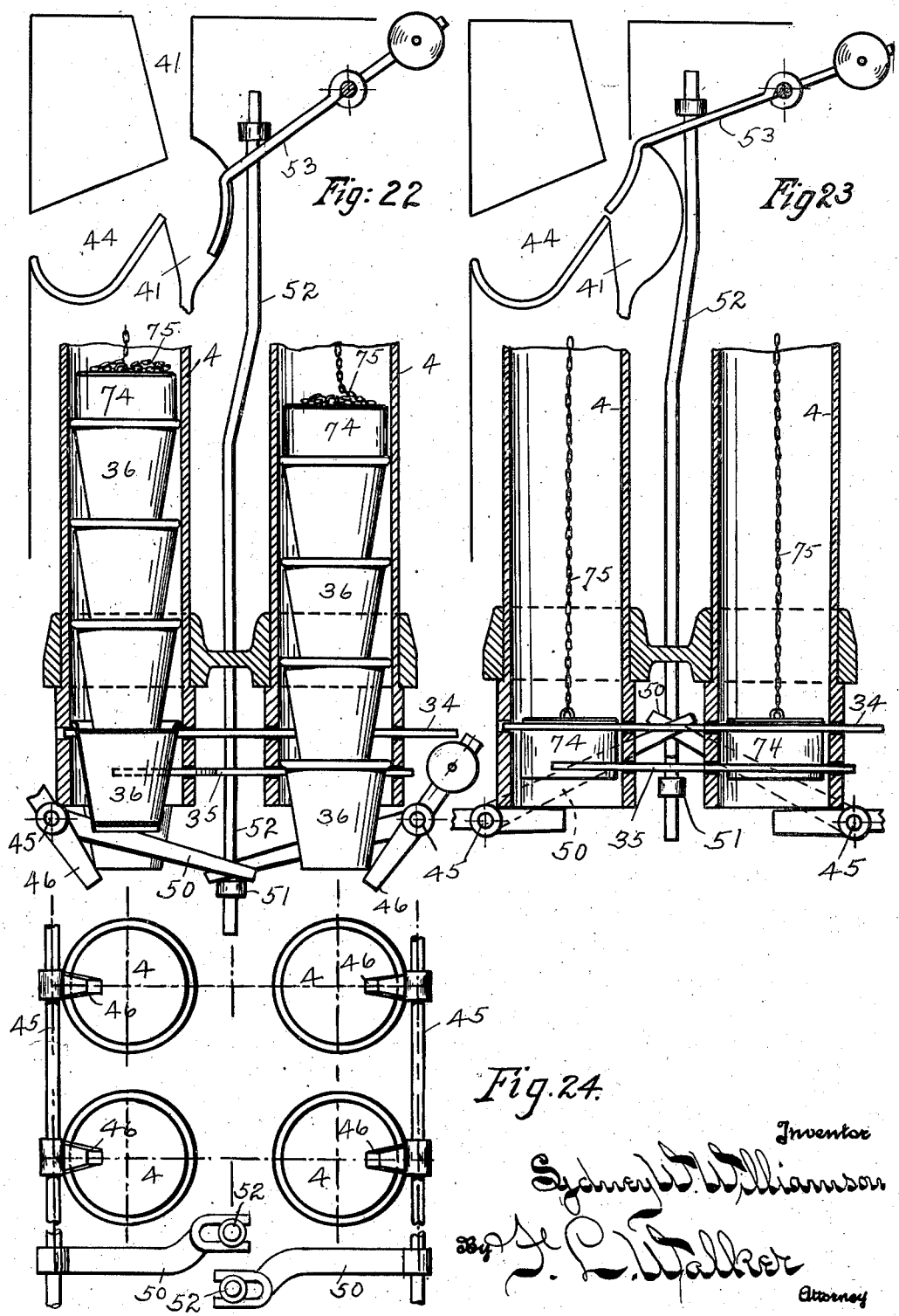

May 4, 1937.  S. W. WILLIAMSON  2,078,984
PACKAGE DISPENSING APPARATUS
Filed Jan. 21, 1932   11 Sheets-Sheet 10

Inventor:
Sydney W. Williamson
By F. L. Walker
Attorney

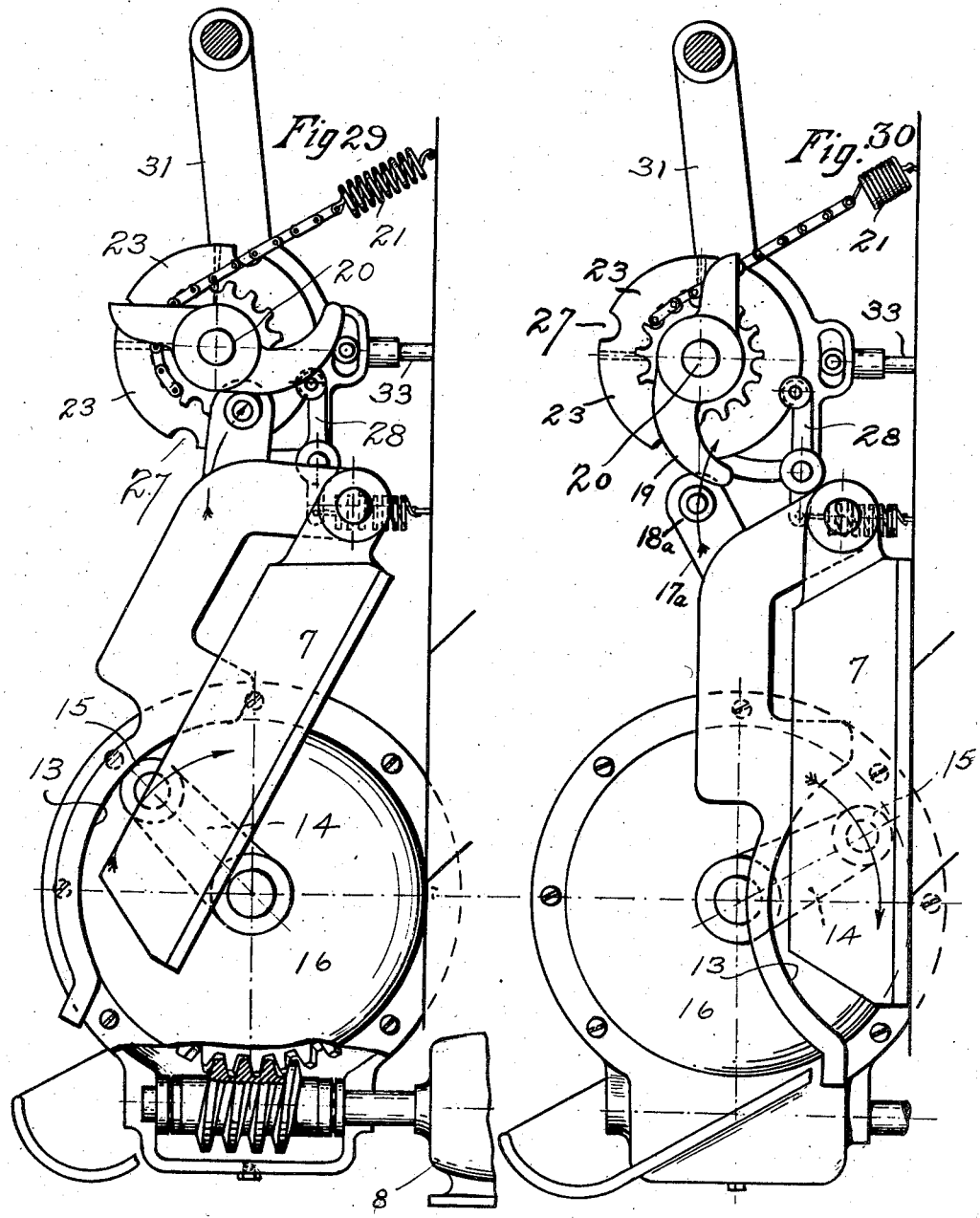

Patented May 4, 1937

2,078,984

UNITED STATES PATENT OFFICE 2,078,984

PACKAGE DISPENSING APPARATUS

Sydney W. Williamson, Dayton, Ohio, assignor to Ice Cream Dispensing Corporation, a corporation of Delaware Application January 21, 1932, Serial No. 587,951

52 Claims. (Cl. 194—7)

This invention relates to a dispensing apparatus for single articles or package goods, and more particularly to refrigerated commodities such as ice cream, ices and butter, and may be adapted for bottle goods such as cream, milk or beverages, or for dispensing beverages in measured quantities and supplying a cup therewith and is preferably, though not necessarily, check or coin controlled.

In its preferred embodiment, the apparatus includes a cabinet having therein a refrigerating compartment containing a plurality of commodity magazines. The packages or articles are progressively released from the bottoms of different magazines successively and discharged through a common outlet orifice of relatively small proportion at the bottom of the compartment automatically opened and closed by a motor operated closure. The cold air within the compartment is maintained in substantially a state of equilibrium between a partial vacuum at the top of the compartment and the pressure of exterior warm air when the discharge orifice is opened, thereby minimizing loss of cold air. By minimizing the entrance of moist outer air, excessive deposit of frost is avoided.

The object of the invention is to simplify the construction as well as the means and mode of operation of article and package dispensing apparatus whereby it is not only cheapened in construction, but will be more efficient in operation, automatic in its action, motor actuated, of durable construction and unlikely to get out of repair.

A further object of the invention is to provide a refrigerated dispensing compartment from which packages or articles may be discharged with minimum loss of refrigeration.

A further object of the invention is to provide an improved method of minimizing losses of cold air and entrance of moist air upon opening of the refrigerating compartment for discharge of articles thereby minimizing moisture condensation and resulting deposit of frost.

A further object of the invention is to provide improved motor operated closure means for the refrigerating compartment.

A further object of the invention is to provide improved selective means by which articles or packages are discharged successively from different magazines thereby increasing the capacity of the apparatus and preventing early exhaustion of any particular magazine.

A further object of the invention is to provide improved intermittently operating non-repeat mechanism by which the magazine selective and article release mechanism is arrested and the discharge orifice closed at the completion of each cycle of operation, resulting in the discharge of a single article or package.

A further object of the invention is to provide operation preventive means common to a plurality of article or package magazines effective whenever the next magazine of a series to be released is empty regardless of the amount of contents of other magazines of the plurality.

A further object of the invention is to provide for automatically resetting the operation preventive means by the deposit of an article or package to be dispensed in the empty magazine without the necessity of other attention or adjustment.

A further object of the invention is to provide an improved form of door operating mechanism which will be quick acting and provide compensating adjustment to insure a tight closure.

A further object of the invention is to provide such apparatus having comparatively few parts of compact arrangement and economical construction.

With the above primary and other incidental objects in view, as will more fully appear in the specification, the invention consists of the features of construction, the parts and combinations thereof, and the mode of operation, or their equivalents, as hereinafter described and set forth in the claims.

Figure 3:
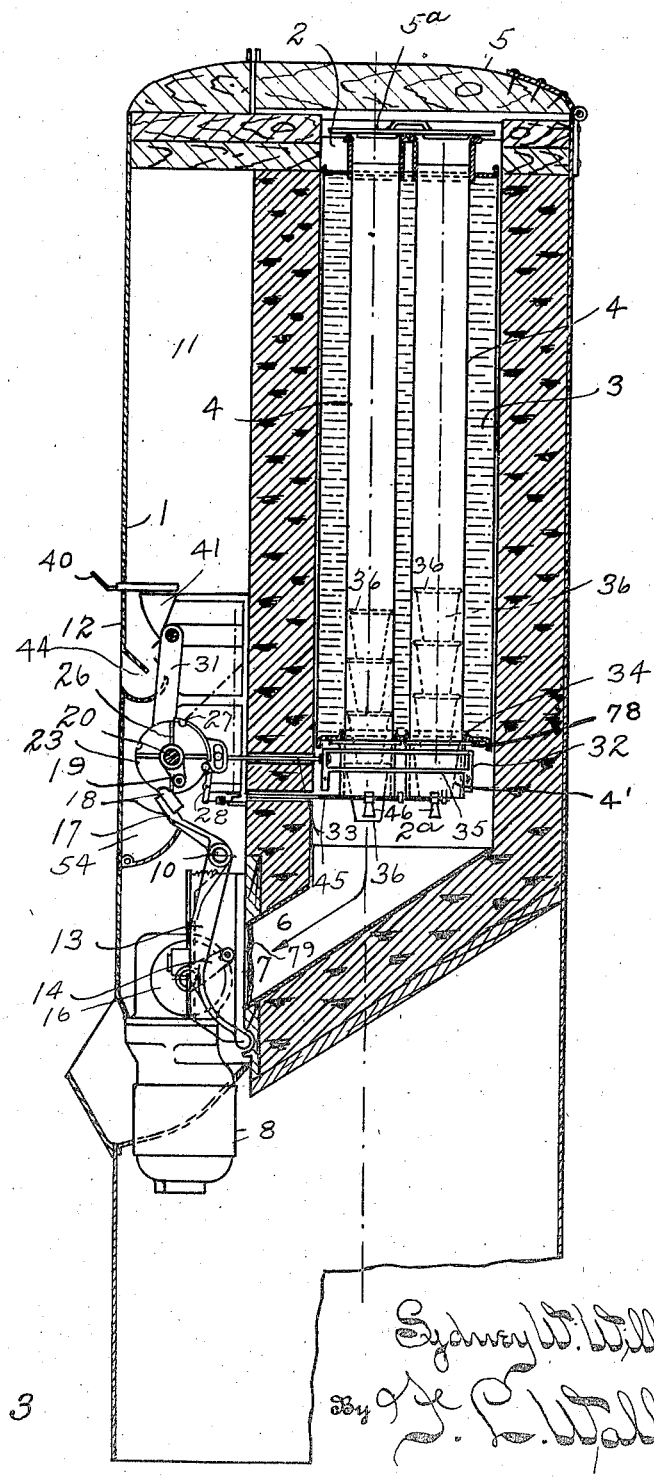
Figure 4:
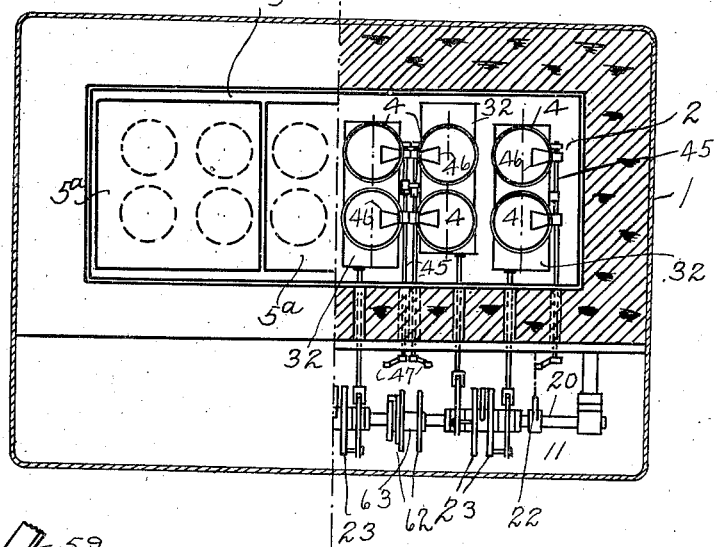
Figure 12:
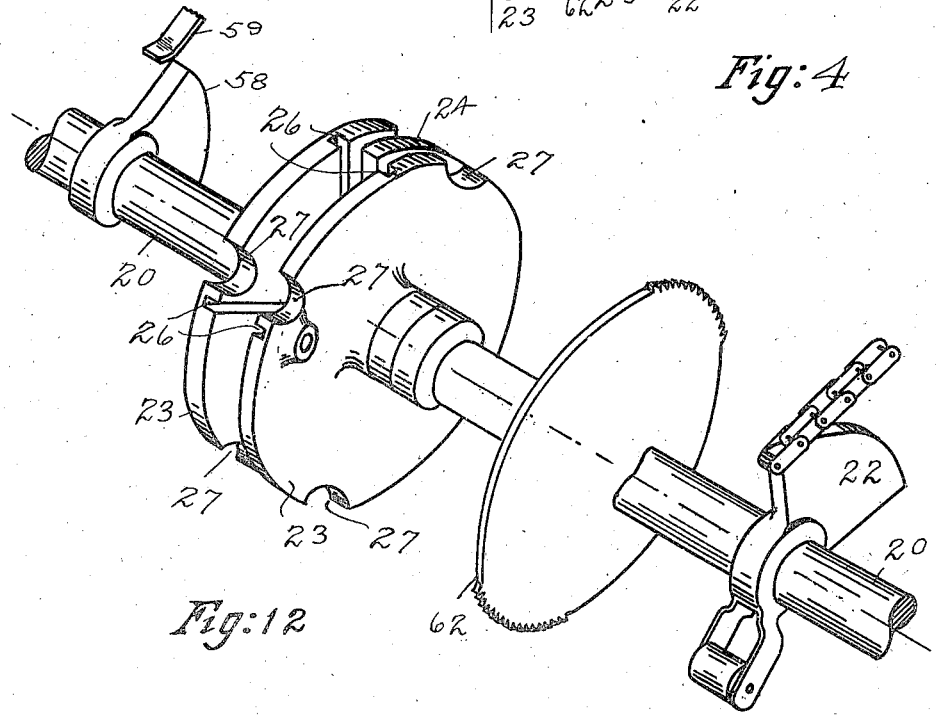

In the accompanying drawings wherein is shown the preferred but obviously not the only form of the embodiment of the invention, Fig. 1 is a perspective view of the vending machine cabinet within which is enclosed the apparatus forming the subject matter hereof. Fig. 2 is a front elevation, partly in section of the cabinet on line 2—2 of Fig. 3, and enclosed apparatus. Fig. 3 is a vertical sectional view on line 3—3 of Fig. 2. Fig. 3a is a sectional view of a modification. Fig. 4 is a top plan view partly in section. Figs. 5 and 6 are side elevations of the discharge door operating and selective mechanism in its normal and operated positions respectively. Figs. 7 to 10 inclusive illustrate successive stages in the cycle of operation of the magazine selective mechanism. Fig. 11 is a detail sectional view of the check or coin coupled actuating discs for the magazine selective mechanism and spoon discharge devices carried upon the main operating shaft. Fig. 12 is a perspective view of a portion of the main shaft and parts carried thereby. Figs. 13 to 17 inclusive illustrate different positions of adjustment of the check or coin coupled actuating discs for the magazine selective mechanism.

Fig. 18 is a perspective view of two article or package detent slides positioned side by side in the relation they are disposed relative to a group of magazines. Fig. 19 is a detail view of a plunger rod or stem for a detent slide. Figs. 20 and 21 are detail side elevations of the mechanism for arresting the operation of the dispensing apparatus when the supply of articles or packages is exhausted, Fig. 20 showing the parts in their normal position prior to exhaustion of the package supply, and Fig. 21 showing the same parts in their operated positions when the magazines are empty. Figs. 22 to 24 illustrate a modification of the apparatus arresting mechanism, wherein Figs. 22 and 23 illustrate the parts prior to and after the article or package supply is exhausted, and Fig. 24 is a detail top plan view. Figs. 25 to 28 inclusive illustrate the addition of a check or coin ejecting and display arm which is supplemental to the construction shown in Figs. 12 to 16 inclusive. Figs. 29 and 30 are side elevations of a modification of the discharge door operating and magazine selective apparatus shown in Figs. 5 and 6. Fig. 31 is a detail sectional view of a spoon supply magazine and ejecting means therefor. Fig. 32 is a detail end view of a modified magazine tube.

Like parts are indicated by similar characters of reference throughout the several views.

Among the several problems of satisfactory dispensing machine refrigeration is the prevention of excessive frost deposits resulting from the condensation of the moisture content of air admitted from the outside and provision of sufficient "hold over" capacity to compensate for frequent opening of the cold storage compartment.

In the present construction the cold storage compartment is of substantially "inverted bottle" form in which little or no circulation of air occurs. It contains a considerable number of tubular reservoirs but slightly larger in cross sectional size than the packages to be dispensed, whereby but little air space is left therein when the reservoirs are full. The space intermediate the reservoirs is occupied by a brine tank or other heat absorption medium affording the necessary cold capacity. The discharge outlet from the compartment is of comparatively small area and is located at the bottom of the storage compartment in spaced relation below the package reservoirs and the operation mechanism affording an intermediate cold air chamber, the capacity of which is sufficient that the loss of cold air in ordinary operation will but slightly affect the temperature within the compartment. The only moving parts exposed to moisture condensation are the coin return operator and the reciprocating detent and release slides for the packages which are located below the brine tank or other storage means which affords colder condensing surfaces and hence accumulates the greater portion of any condensation, such package slides operating to and fro through slots in the bottoms of the reservoir tubes having ample clearance, are self clearing of such frost deposit as may accumulate. The mountings for the detent and release slides are preferably, though not necessarily, thermally insulated from the brine tank and package magazines whereby frost accumulation is minimized.

It is contemplated that the package reservoirs will be replenished before becoming entirely empty, in which case the remaining package or packages at the bottom of the reservoir tube will exclude from the cold air chamber at the bottom of the compartment the warm air admitted at the top. As the packages are deposited within the reservoir tubes, the air therein will be displaced so that even after servicing there will remain but very little moisture laden air, and little or no frost will be deposited upon the tubes and ejecting apparatus.

While special means for excluding outside air during servicing is not essential, it is nevertheless desirable since it reduces maintainance expense. The admission of warm air during servicing is minimized by providing separate closures for the several magazine tubes whereby only one magazine is open at a time. Such individual closures are preferably weighted to prevent their displacement by upward air pressure in one tube as a package descends in a neighboring tube. The magazines are proportionate to the size of the packages to be dispensed so that the packages loosely fill the magazine tubes and when dropped therein during servicing they exert a piston like effect which tends to compress the cold air within the magazine tube ahead of the package causing such cold air to be discharged through any available outlet and particularly through adjacent magazine tubes with which the tube being refilled communicates through the cold air compartment therebelow. Such displacement of cold air is resisted by weighted closures for the magazines other than that being serviced.

Such piston like effect also tends to draw into the magazine tube outside moist air which upon contact with the chilled surfaces deposits condensation in the form of frost within the magazine tubes and elsewhere.

To prevent the entrance of moist outside air, a filling device is employed through which the packages are inserted and which will exclude outside air from the tube. This device is preferably a flexible diaphragm having an opening for the passage of a package which will support one package until the next package is in position to take its place.

The effect of closing, so far as possible, the cold air outlets, especially other magazine tubes and the provision of a closure for the tube being filled causes a slight increase of air pressure within the magazine tube ahead of a descending package and a slight vacuum effect above the package which tends to retard the rapidity of its descent and thus there is less danger of damaging packages by dropping them into a substantially empty magazine tube. The filling device may be permanently incorporated in the dispensing apparatus as a portion of the magazine tube, but is preferably a separate device to be applied only during the replenishing interval and to be transferred from one magazine tube to another.

The use of the brine tank for heat absorption purposes insures uniformity and more direct temperature effect upon the stored packages than would the use of a dry refrigerating coil operating by convection air currents to cool the packages, in which case the coil, reservoir tubes and ejecting mechanism are quite likely to become frost coated and thereby temperature insulated and hence the packages would be subject to a wide range of temperature change.

The discharge door from the storage compartment is automatically actuated in timed sequence, in the shortest possible time required for delivery, and being motor operated its closing movement can not be delayed by the purchaser or operator. Thus heat leakage or loss of refrigeration is minimized at this point. Furthermore by application of motor power, much stronger springs may be employed to maintain a tight seal of the delivery door than could be used for manual operation, especially in view of the fact that machines of the present type are frequently operated by children of varying ages. The motor operation insures uniform action and prevents much abuse by improper operator controlled actuation, and hence prevents the machine becoming out of order. The motor actuator is such that it operates the door in one direction only, opening it against tension by which it is in turn closed. The motor actuating means is entirely disconnected at the end of the closing movement, allowing the door to be held closed under spring or weight influence, which will compensate for variations of door packing, and will obviate the necessity for accurate adjustment of the actuating mechanism as would be the case if the door is positively closed and stopped in a definite position by the operating mechanism. The spring tension upon the closed door maintains a thermally tight joint regardless of wear, changing spring tension or packing compression.

Referring to the drawings, 1 is a cabinet having suitably insulated walls forming a refrigerating compartment 2 within which is preferably, though not necessarily, located a brine tank 3 or other reservoir of refrigerating medium. Extending vertically through the compartment, and in the present instance through the brine tank 3, are a series of tubular magazines 4—4 containing in superposed relation the articles to be dispensed. These magazine tubes 4 are open at both their upper and lower ends. The refrigerating compartment 2 is provided with a door or removable closure 5 at its top affording access to the compartment for replenishing the supply of articles or packages within the magazine tubes. Interiorly of the closure lid 5 and overlying the upper ends of the reservoir tubes 4 is a supplemental lid 5a consisting of a removable metal plate, preferably formed in sections, one for each tube or each group of reservoir tubes as hereafter described. This plate 5a serves duo-functionally as a supplemental closure and also as a condenser plate. Being in direct contact with the top of the brine tank and with the tops of the reservoir tubes, the plate becomes quite cold and will collect moisture from the air which may leak into the top of the compartment before it reaches the reservoir tubes and operating parts. While servicing the machine these removable plate sections may be laid aside and the frost accumulation allowed to melt off. Moreover the sectional form of the plate 5a, only one portion of which is removed at a time, enables a part of the reservoir tubes to be maintained closed while the remainder are open for servicing. This auxiliary lid might be rubber, fiber or other non-metallic material in which case the condenser function would be lost, but for some conditions of use it may be desirable to afford an air tight seal without the frost accumulating feature.

The closure 5 hermetically seals the top of the compartment, effectually preventing the entrance of outside air to replace the cold air which tends to descend within the magazine tubes as it is chilled and to escape when the compartment is opened at its bottom.

While the duo-functional multi-tube closure and condensing plate 5a heretofore described has been found quite practical, the use of individual closures for each of the magazines is preferable. Such construction is shown in Fig. 3a wherein a metallic closure weight 5b is suspended within the upper end of each magazine tube 4 from a rubber collar or annular flange 5c secured to the weight by a clamp disc 5d. The latter having contact with the weight 5b becomes quite cold and serves as a condensing surface for moisture which may enter the compartment above the magazine tubes. The rubber collar insures an air tight contact with the extremity of the magazine tube. By use of individual closures only a single magazine tube is open at a time for servicing and the admission of outside air is greatly minimized.

The compartment 2 extends somewhat below the lower ends of the magazine tubes 4—4 affording a cold air chamber 2a with which the magazine tubes communicate and which encloses a comparatively large volume of cold air. Due to the relatively large body of confined cold air the small loss of refrigeration by opening of the delivery door will effect only a very slight change of temperature about the packages at the bottom of the reservoirs to be discharged at the next operation. Leading from such cold air chamber is a discharge outlet 6 of restricted area provided with an automatically actuated closure door 7. The sides and bottom walls of the chamber 2a converge toward the outlet orifice 6 and guide thereto the articles or packages when released from the magazine tubes 4—4.

The cold air within the compartment being heavier than the warm air tends to flow out of the orifice 6 when the door is opened. However such cold air can escape only as it is replaced by warm air. The comparatively large volume of cold air within the chamber 2a striving to pass through the outlet 6 creates sufficient pressure to repel or resist the entrance of outside air. The tendency of the cold air to descend within the compartment 2, due to the cooling effect or as result of opening the outlet door 7, creates a partial vacuum within the top of the compartment 45 which is hermetically sealed by the closure 5. Thus after having assumed a state of substantial equilibrium, the body of cold air not being subject to an equalizing pressure at its top is maintained in a substantially balanced condition by the pressure of the exterior warm air at the outlet orifice 6 when the door is open. That is to say, due to the presence of partial vacuum in the top of the refrigerating compartment the column of cold air therein is counterbalanced by the pressure of the exterior warm air in somewhat the same manner that the column of mercury is counterbalanced and maintained in the tube of a barometer by atmospheric pressure. As a result, while there may be some escape of cold air and entrance of warm air through the outlet orifice, such exchange of warm and cold air will be very materially reduced and in practice is found to be a quite negligible quantity.

The magazine tubes 4—4 are disposed in batteries or groups of four tubes or magazines each in the present instance, although they may be otherwise arranged. Each tube is provided with releasable package detent means at its lower end and selective means is provided for releasing the detent means of the different magazines of each group or battery in predetermined sequence. The purpose of this arrangement is to materially increase the capacity of the apparatus without making it excessively high and insuring that no packages will be allowed to remain in the magazines so long as to become stale. If one magazine was entirely exhausted before dispensing from a second magazine and the supply replenished before the last magazine was emptied, it might occur that packages would remain in the last magazine indefinitely. However by progressive selection of packages from different magazines in sequence such difficulty is obviated, and by discharging always the lowermost package or article from each magazine the packages are dispensed in the order in which they are placed in the apparatus, and there can be no accumulation of stale commodity while the apparatus continues in operation, regardless of how frequently the supply is replenished.

In the drawings three such groups or batteries of four magazine tubes each have been illustrated. Each group has its independently operable magazine selective and article release mechanism. Different groups or batteries of magazines may be utilized to dispense different commodities or one commodity such as ice cream of different flavors.

The magazine selective and article release mechanism and the door 7 controlling the outlet 6 from the refrigerating chamber are motor actuated in proper timed sequence by an electric motor 8 set in operation by either a manually operated switch or by deposit of a check or coin by which the motor circuit is closed. Such motor actuates the parts through one complete cycle of operation and comes to rest with the parts restored to normal position preparatory to a succeeding operation.

The door 7 is suspended upon a swinging frame 9 hinged at 10 to the front wall of the refrigerating compartment 2, between which and the front of the cabinet 1 is a space 11 forming a compartment enclosing the operating mechanism. The mechanism therein is accessible through the cabinet front by means of a door 12. The door 7 of the refrigerating compartment is yieldingly mounted upon the swinging frame for limited compensating adjustment against spring tension independently of the frame to insure a tight sealing joint when the door is closed.

The swinging suspension frame 9 upon which the door is carried is provided with a curved cam arm 13 extending into the path of travel of a rotary crank 14 having at its extremity a contact roller 15. The crank 14 is driven by the motor 8 through suitable speed reducing mechanism preferably comprising a worm gear transmission contained within the gear housing 16. The actuating motor and crank are permitted a limited range of idle motion intermediate succeeding periods of effective operation which enables the motor to be started without excessive load and permits an ample range of overthrow or "coasting" of the motor upon the completion of the cycle of operation. The motor being set in operation when the crank arm 14 is approximately in the normal position shown in Fig. 5, from which it may vary somewhat in either direction, the contact roller is brought into engagement with the cam arm 13 and by continued motion of the crank the arm 13, and with it the swinging frame 9 and door 7 are oscillated to the position shown in Fig. 6. The continued rotation of the crank 14 beyond the position shown in Fig. 6 permits the frame 9 and door 7 to swing reversely to closed position. The crank arm 14, however, always moves in the same direction, as is indicated by the arrow in Fig. 6.

The swinging frame 9 is provided with an upwardly extending oscillatory arm 17 having at its upper end a contact head 18 into the path of movement of which projects a rock arm 19 upon the actuating shaft 20 pertaining to the magazine selective and article release mechanism. As the suspension frame for the door 7 is swung to and fro, the shaft 20 is simultaneously rocked to and fro through a movement of approximately ninety degrees. Such movement is effected in one direction (from the position shown in Fig. 5 to that shown in Fig. 6) by the pressure of the crank arm 14 upon the rock arm 17, against the tension of a retracting spring 21 connected with a segment head 22 upon the rock arm 19. As the operating arm 17 recedes upon closing movement of the door 7, the rock arm 19 and shaft 20 return to normal position under retractive influence of the spring 21.

Carried upon the rock shaft 20, opposite each battery or group of magazine tubes 4—4, is a pair of radially slotted discs 23 disposed with their slotted faces toward each other and with their slots aligned. These discs 23 are loosely mounted upon the shaft 20 and electrically insulated therefrom. Intermediate the discs 23 of each pair is a segment 24 fixedly secured to the shaft 20 for to and fro oscillation therewith. The shaft 20 and segment 24 are free for rocking motion independently of the discs 23 unless coupled therewith. Such coupled connection is effected by depositing a coin or check illustrated at 25 within the registering slots 26 of the discs 23 in advance of the segment 24. The inserted coin serves duo-functionally to electrically connect the discs 23 and segment 24 which are included in the motor circuit to close such circuit, and also to operatively couple the particular selective and detent means for mechanical operation. It is to be noted that the forward face of the segment 24 is slightly inclined in intersecting relation with the plane of the slots 26 of the discs 23 whereby the deposited coin or check simultaneously engages the discs 23 and segment 24 with a wedging contact whether it be thick or thin and insures electrical as well as mechanical connection. Upon oscillation of the shaft 20 and segment 24 effected by means of the arms 17 and 19, the segment 24 having engagement with the coin or check 25 carries the discs 23 forwardly through a quarter rotation in unison with the rocking motion of the shaft 20. Upon return motion of the shaft and segment, the discs 23 and coin 25 are left in their advanced position and the shaft and segment return idly preparatory to the succeeding operation. The discs 23 are peripherally notched at 27 for engagement of a detent roller upon a spring actuated oscillatory arm 28 which yieldingly holds the discs in operated position and insures the accurate location of the coin receiving slots 26 to receive the next deposited coin or check. This arm also affords a wiping electrical contact for the discs 23 by which the discs are included in the motor circuit. The discs 23 are provided with four sets of radial coin or check receiving slots 26 located at ninety degree intervals. Thus as the rocking segment 24 by engagement with a deposited coin or check advances the discs 23, it causes the succeeding pair of coin receiving slots to be positioned in coin receiving position. The discs 23 carry upon their outer faces contact rollers 29, having operative engagement within cam openings 30 in swinging magazine selector arms 31 which actuate article release slides. There is an arm 31 for each disc 23, or two for each group or battery of magazine tubes. Such arms are arranged in pairs and located at the outer sides of the discs 23, with contact rollers 29 extending within the cam shaped openings 30. As the discs 23 are rotated the rollers engage first one side and then the other side of the cam opening 30 to move the arms in alternate directions. This movement, however, occurs intermittently with intermediate periods of rest during which the roller traverses portions of the cam opening then concentric with the circular travel of the roller about the shaft 20. The discs 23 are operated intermittently through successive ninety degree movements. During one such movement the roller engages one side 30a of the cam opening and moves the arm 31 rearwardly as illustrated in Fig. 7. During the succeeding ninety degree movement of the discs 23 the same roller will move idly over a portion 30b of the cam then concentric with the shaft 20 as shown in Fig. 8, to which position it will have been moved by the oscillation of the arm. Upon the next actuation of the discs, the roller 29 engages with the opposite side 30c of the open cam and actuates the arm 31 in a forward direction, as illustrated in Fig. 9. In its movement through the final quadrant of its path of travel, the roller 29 travels idly over the concentric portion 30d of the cam while the arm 31 remains at rest, as shown in Fig. 10. The rollers 29, upon the respective discs 23 of each pair, are rotatively spaced ninety degrees apart. Therefore while the roller 29 of one disc travels idly relative to one swinging selector arm 31, the roller 29 of the other disc of the pair is in operative engagement with its corresponding swinging selector arm 31, so that the selector arms 31 are actuated alternately.

By varying the shape of the cam surfaces or by changing the relation of the actuating rollers, the selective mechanism may be operated in different sequence or it may be adapted to a larger group of reservoirs.

Connected with each of the selector arms 31 is a detent slide 32 pertaining to two article magazines 4—4. As is shown in Fig. 4 the four magazines 4 comprising each group are arranged in two pairs side by side. The magazines of each pair, comprising one forward magazine tube and a second magazine tube immediately in the rear of such forward tube, are controlled by a common detent slide 32 which intersects the magazine tubes adjacent to their lower ends. By its to and fro motion under influence of the swinging selector arm 31 to which it is connected by a plunger rod or stem 33, the detent slide releases a package first from one magazine tube and then from the other. However the slides 32 being arranged in pairs and operated alternately by the alternation of the selector arms 31 a package or article is released from a tube of the companion pair intermediate the release of packages from the tubes of the first pair. Thus the lowermost package is released successively from each of the four magazine tubes comprising the group, the supplies in different tubes being uniformly dispensed.

The detent slide 32 is provided with openings for the passage of the articles or packages therethrough which are shaped and proportioned in accordance with the shape and size of the articles to be dispensed. For illustrative purposes, but with no intent to limit the application of the invention or dictate the character, form or size of the article or package dispensed, the apparatus has been shown supplied with a succession of containers or filled cups 36 of truncated conical form and provided with a marginal rim or bead, such as might be utilized for dispensing ice cream, ices, cottage cheese, peanut butter or the like. Each detent slide 32 comprises spaced upper and lower supporting plates 34 and 35 having therein what are in effect "key hole" openings, arranged in reverse relation. The restricted portions of the openings are alternately positioned in registry with the respective magazine tubes by the shifting of the slide, to receive a package 36. The lowermost packages 36 are suspended through such openings by the engagement of the marginal beads or rims of the packages upon the adjacent portions of the slide plates 34 and 35 and from which they are dislodged by the subsequent shifting movement of the slide. These detent slides are shown in detail in Fig. 18, and the action thereof is illustrated in Figs. 20 to 23. As shown in Fig. 18 the upper plate 34 has a single elongated opening rounded at each end to agree with the semi-circumference of a container 36 immediately below its margin rim or bead, the medial portion of the opening being sufficiently enlarged to permit the rim or bead of the container to pass therethrough when such container is dislodged from the semi-circular end bay by the shifting movement of the slide. The lower plate 35 is provided with two reversely disposed openings, each having a semi-circular portion at its inner end, agreeing with the periphery of the container 36 immediately below its rim or bead, and an enlarged connecting portion adjacent the corresponding end of the slide. The enlarged portion of the opening of one plate is substantially in registry with the semi-circular portion of the opening of the other plate and vice versa, whereby when a container is dislodged from the semi-circular portion of the upper plate 34 of the detent slide it descends into the semi-circular portion of an opening of the lower plate 35 where it is again temporarily suspended by the overhanging engagement of its rim or bead with the adjacent portion of the plate.

Referring to Fig. 20 and particularly the magazine tube at the right, i. e., the rearmost tube of the pair, it will be noted that the containers 36 are supported one upon another within the magazine tubes 4, with the lowermost container suspended upon the detent slide 32 by the overhanging engagement of its marginal rim upon the upper plate 34 with the body of the container projecting through the registering openings in the detent plates 34 and 35. The lowermost container in the forward magazine tube is suspended in like manner upon the lower plate 35 of the detent slide as shown at the left in Fig. 20. Upon shifting motion of the slide by means of the plunger stem 33 having operative connection with the selector arm 31, the containers are held within the magazine tubes against lateral movement while the slide moves relative thereto to bring the enlarged portions of the openings in the respective plates about the packages which being dislodged from the semi-circular portions of the openings are permitted to fall therethrough. The lowermost container (at the left in Fig. 20) when released from the plate 35 drops into the chamber 2a of the refrigerating compartment and slides on the inclined bottom through the outlet 6, the door 7 of which has been opened in proper timed sequence with the actuation of the mechanism by which the package was released, and is received in the exterior bowl 36. At the same time the descent of the other packages in the same magazine tube is arrested by the overhanging engagement of the rim of the next succeeding package therein upon the plate 34, the restricted semi-circular portion of the opening in which has been brought to registry with the tube by the shifting movement which released the lowermost package from the plate 35. The packages in the magazine tube at the left will then have assumed the position in which the packages are shown in the tube at the right, in Fig. 20. During the same shifting movement of the slide the lowermost package in the magazine tube at the right will have been dislodged from the upper plate 34 of the slide and will have dropped onto the lower plate 35, the restricted semi-circular portion of the opening in which will have been brought into registry with the magazine tube by such shifting movement of the slide, and the lowermost package in the magazine at the right will be suspended by engagement of its marginal rim upon the lower plate 35 and the superposed packages will be supported thereon, as is now shown at the left in Fig. 20.

The detent slides 32 pertaining to each group of magazines are actuated alternately by the selector arms 31 which are provided with slotted extensions 37 in which the outer ends of the reciprocatory slide plungers or stems 33 are engaged. The plungers 33 are provided with peripherally grooved heads 38 at their inner ends having detachable engagement within slots 39 in the ends of the detent slides 32.

To prevent operation when the supply of articles or packages is exhausted, means is provided for diverting the deposited check or coin and thus preventing the coupling of the operating parts and closing of the motor circuit. The coin is deposited in a reciprocatory manually operated slide 40, of which there is one provided for each group of magazines. Upon inward movement of the coin or check receiving slide 40 the coin drops through a chute 41 which registers at its lower end with the aligned slots 26 of the discs 23 into which the coin or check is normally guided. Interposed in the coin chute 41 is a pivoted counterbalanced gate 42 disposed in inclined position and adapted to divert an underweight coin or check laterally out of the chute through a lateral outlet opening 43 into a return coin or check cup 44. However a coin or check of proper weight will overbalance the counterweighted arm of the gate 42 thus opening the gate downwardly and permitting the coin or check to continue down the chute into the aligned slots 26 of the discs 23. Extending adjacent to the lower ends of the magazine tubes 4—4 is a weight actuated rock shaft 45 having two rock arms 46 normally held out of the path of the descending packages or articles by engagement of one or the other of the arms with the lowermost package in one of the magazine tubes and projected into such path by the weight (or a spring if desired) upon the release of the final package. The rock arms 46 are both fast upon the same shaft 45 and engagement of a package with either rock arm will hold the parts in retracted position. At its forward extremity the rock shaft 45 carries a crank arm 47 connected with an upwardly extending link rod 48 having at its upper end slotted connection with a pivoted lever 49, which serves as a stop for locking the coin chute gate 42.

Each shaft 45 pertains to two magazines, i. e., a pair comprising a front and a rear magazine, and the rocking movement of either shaft 45 will operate to lock the coin chute gate 42 independently of the operation of the other shaft. So long as packages remain on the lower detents ready for delivery from a magazine of each pair, both rock shafts 45 are held inoperative thereby and the coin chute gate is unlocked. However upon exhaustion of the packages whereby no package is ready for delivery from the final release detent of either magazine of each pair, even though a package may be suspended on the upper or primary detent of such magazine, the shaft 45 pertaining to such pair of magazines is released for rocking movement (by the discharge of the final package) and the coin chute is thereby locked, preventing further operation of such battery of magazines even though the magazines of the other pair may be filled. That is to say it is only when both rock shafts 45 are held against movement by packages ready for delivery that the coin gate is unlocked and lack of a package for delivery from either pair of magazines results in locking the coin chute.

The rock arms 46 swing inwardly under the magazine tubes under weight influence. The simultaneous rocking movement of the shaft 45 and crank 47 lifts the link 48 until the end of the slot in the link engages with the locking lever 49 and holds it in locking engagement with the coin chute gate 42 as shown in Fig. 21, thereby preventing the downward opening motion of the gate and causing the gate to divert all coins or checks including those of proper weight out of the chute 41 through the lateral opening 43 into the return coin cup 44. The rock shaft 45 and also the slide rods 33 are comparatively small and of low temperature conductivity and extend through close fitting holes in the heat insulated wall which are preferably provided with suitable packing thereby preventing air leakage at these points.

In Figs. 22 to 24 there is shown an alternative construction wherein the rock shaft 45 carries an arm 50 in lieu of the crank 47, which arm engages with a collar 51 on a reciprocatory rod 52 to hold such rod depressed. The rod 52 at its upper end has engagement with a pivoted, counterweighted coin deflector gate 53 to hold such deflector gate depressed and so permit a deposited coin to descend past the gate and enter the aligned slots 26 of the discs 23 as before described. However when the last package is released and the rock arms 46 are allowed to arise, the arm 50 also rises thereby permitting the rod 52 to ascend and in turn permits the coin diverting gate 53 to align with the coin return cup 44 as is shown in Fig. 23. Thus a deposited coin engaging with the gate 53 is immediately diverted into the return cup 44.

During the actuating movement of the selective and release mechanism the deposited coin or check, which serves as a mechanical coupling means, will be securely gripped within the slots 26 of the discs 23 by the pressure of the segment 24 as shown in Figs. 13, 14 and 15. However as the segment recedes during its further motion as shown in Figs. 15 and 16, the coin is left resting freely in the slots 26 which are then horizontally disposed, until the next operation when upon further rotation of the discs through a ninety degree movement the coin will fall by gravity from the slots 26 into a money box 54 as indicated in Fig. 14.

However in Figs. 25 to 28 there is shown a modification wherein the coin is automatically disengaged from the slots upon return movement of the segment and is held for observation at a peep window until the next operation of the machine. This is for the purpose of discouraging the use of counterfeit coins or spurious checks by publicly displaying them and thus advertising fraudulent operation of the apparatus.

Figure 25:
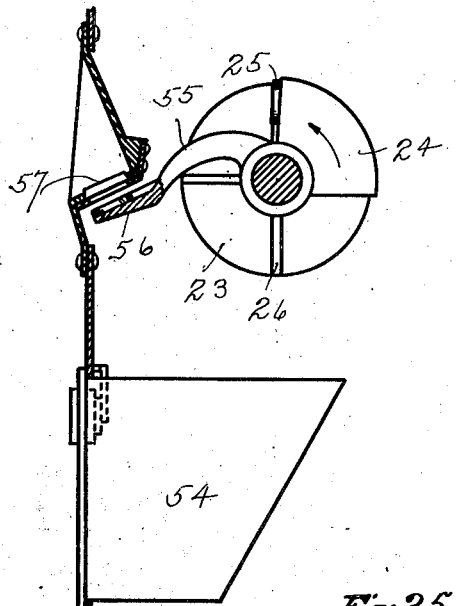
Figure 26:
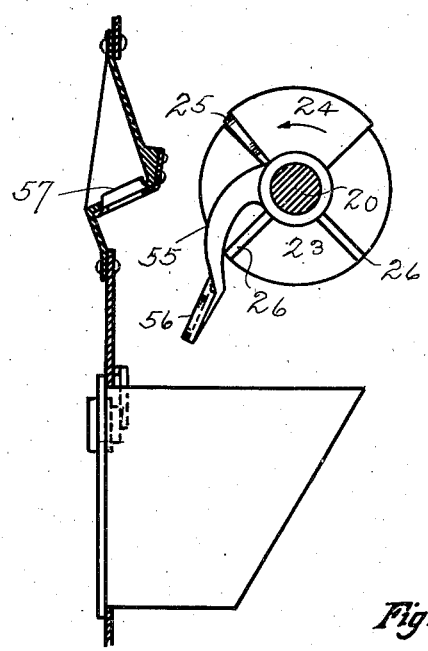
Figure 27:
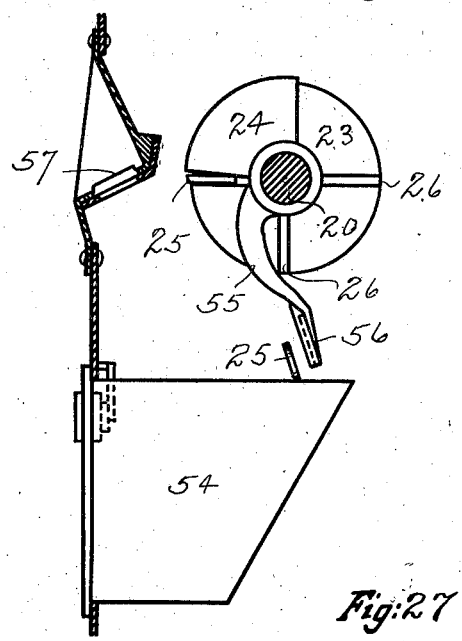
Figure 28:
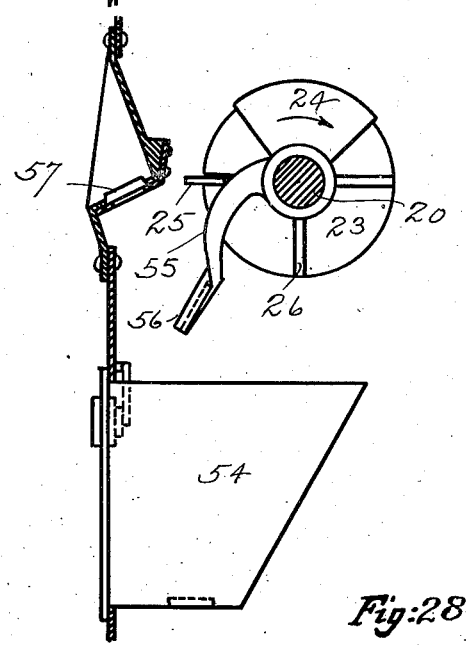

To this end the segment 24 is provided with a cam arm 55 connected to and oscillating with the segment. The cam arm 55 carries a recessed coin pan or holder 56, which when the segment is retracted registers with a peep window 57 in the cabinet. The deposited coin enters the slots 26 of the discs 23 in front of the segment 24 as shown in Fig. 25 and is engaged thereby to advance the discs during the advance oscillation of the segment as before described, and as illustrated in Fig. 26. At the extreme forward movement of the segment illustrated in Fig. 27 the cam arm assumes a downwardly reversed position in which it discharges the previously deposited coin by gravity from the pan or holder 56 into the money box 54. Upon return motion of the segment, the cam arm 55 engages the coin then within the slots 26 of the discs 23 and positively ejects the coin from such slots catching it in the pan or holder 55 as the latter rises and presents it at the peep window 57 as shown in Fig. 25. This positive ejection of the coin or check from the slot is of especial value in the event the coin or check carries a sticky substance, such as chewing gum, deposited with the coin for intended fraudulent operation or for blocking the mechanism.

Inasmuch as the deposited coin is preferably, though not necessarily, employed to close the motor energizing circuit as well as mechanically couple the operating parts, the initial return motion of the segment 24 will open such electrical connection and if other circuit maintaining means was not provided the motor would come to rest. To maintain the motor circuit closed during the return travel of the parts, there is provided upon the shaft 20 an electrical contact segment 58 with which coacts a wiper contact arm 59. The contact segment 58 is electrically common with the segment 24, both segments being fixedy mounted in electrical contact with the shaft 20 which is included in the motor circuit. The motor circuit is preferably insulated from the cabinet and is opened between the segment 58 and wiper 59 and also between the segment 24 and discs 23. These circuit breaking points are preferably on the same side of the motor circuit to avoid accidental short circuiting.

The wiper contact arm 59 is electrically common with the discs 23. The contact segment 58 is so disposed upon the shaft 20, and of such extent that it will maintain the circuit closed until the parts approach normal position, whereupon the momentum or "coasting" of the motor will carry the segment idly beyond the contact position out of registry with the segment 24 so that in normal position the segment 58 recedes beyond the wiper contact 59 thus opening the motor circuit at this point and maintaining the driving motor 8 inoperative until the circuit is closed and motor operation initiated by a deposited coin which electrically connects the insulated discs 23 and the segment 24. Upon initial rotary motion of the shaft and segment heads under influence of the motor 8 when the circuit is closed by a deposited coin, the segment 58 is brought into operative contact with the wiper arm 59 and thereafter the motor circuit is maintained closed through such contact during the entire operative cycle and is broken by the overthrow of the motor at the end of the cycle. The crank arm is permitted an ample degree of idle travel after leaving the door hanger arm 17 before again engaging it for the succeeding operation thus allowing for such overthrow of the motor.

In Figs. 29 and 30 there is shown a modified construction wherein the driving motor is horizontally disposed instead of vertically as shown in Figs. 3, 5 and 6, and wherein a roller 18a on an arm 17a engages with a cam arm 19 on the shaft 20. The retracting spring 21 is connected by a sprocket chain with a sprocket wheel 22a in lieu of the segment head 22 before described. The curvature of the cam arm 13 is such that when the door 7 is in open position to which it is moved by engagement of the roller 15 on the crank 14 with said arm 13, the arm is substantially concentric with the path of travel of the roller whereby after being quickly opened the door is held stationarily for sufficient period of time for the discharge of the released package and is then quickly closed.

When dispensing ice cream, ices, or other commodities to be immediately eaten, it is desirable to supply a wooden spoon or paddle with each package. For this purpose there is provided a magazine 60 attached to the inner side of the cabinet door 12 in which are contained stacks of spoons or paddles 61, arranged side by side. The spoons or paddles are ejected one by one from the bottom of the stacks alternately by means of toothed ejector wheels 62 carried upon the shaft 20 and given partial rotations at each operation of the apparatus. The disposition of the toothed ejector wheels is best shown in Fig. 11. These wheels are arranged in pairs and are carried upon a sleeve 63 loosely mounted on the shaft 20 and to one end of which is secured a ratchet wheel 64. A rock arm 65 on the shaft 20 carries a pawl 66 engaging the ratchet wheel and advancing the ratchet wheel and with it the sleeve 63 and toothed ejector wheels 62 at each actuation. The spoons or paddles 61 rest upon the toothed ejector wheels 62 and upon a guide roller 67, with the lowermost paddle aligned with a discharge opening 68 in the cabinet door as shown in Fig. 31. The ejector wheels 62 are toothed through only limited portions of their peripheries and such toothed portions are offset on different pairs of wheels, there being one pair for each stack of paddles, whereby paddles are fed from different stacks alternately. The supply of paddles are pressed downwardly within the magazine into feeding contact with the ejector wheels by a follower weight 69. The ejector wheels are yieldingly held in advanced position during return movement of the pawl by a roller detent 70 carried upon a spring actuated arm 71 which engages successively in peripheral notches in a disc 72 connected to and rotating with the toothed wheels.

Inasmuch as little or no moist warm air enters the refrigerating compartment, but little difficulty is experienced due to accumulation of frost from moisture condensation. While the magazine tubes 4 have been illustrated as of uniform cylindrical construction, they may be longitudinally corrugated as shown in Fig. 32. This construction affords a materially increased refrigerating surface in contact with the refrigerant within the tank 3 and also for air contact within the magazine tubes. It affords multiple air passages within the magazine tubes past the articles contained therein and accumulation space for frost where it will not interfere with the descent of the articles. For conditions of use with moisture containing commodities or in localities where, due to moisture in the air entering the compartment during replenishing of the magazines, excessive frost deposits are likely to occur, removable liners 73 may be inserted within the magazines which may be withdrawn for defrosting. Such frost deposits may, however, be readily removed by use of a suitable scraper, preferably of the expanding type, which when contracted may be inserted into the magazine tube from above and then withdrawn in expanded condition drawing with it the frost deposit, and to retard the velocity of the discharged packages to prevent their projection beyond the receiving bowl of the cabinet.

In Figs. 22 and 23 weights 74 are shown which rest upon the uppermost packages of the several magazines to afford sufficient weight to move the last package in event the coin deflector mechanism becomes sluggish or offers resistance due to frost accumulation. The descent of such weights are limited by chains 75 upon which the weights are suspended when the last package has been discharged. Such weights are mere precautionary devices and are not essential and have not been found necessary under ordinary conditions of operation of dispensing packages of usual weight. However when dispensing packages of very light weight such additional gravity influence may be found desirable.

While it is quite practical when servicing to merely drop the packages into the open magazine tubes, as before stated such procedure tends to displace cold air from the magazine tubes and compartment and draw moist outside air thereinto. To prevent such occurrence, there is preferably, though not necessarily, employed a funnel like filling device 77 which is preferably removably mounted on the top of the magazine tube to be filled, but which might be permanently connected therewith. Such filling device is illustrated in Fig. 3a. The filling device is provided with a flexible diaphragm 76 of rubber or like material having therein an opening through which a package may be forced. The diaphragm grips the package sufficiently tightly to support the package until it is displaced by another. The preferable diaphragm comprises several sheets of flexible rubber superposed one upon another and radially slit from a central point to provide a self closing opening. The radially slit rubber sheets are disposed with the radial slits offset out of registry with each other whereby the tongues of one sheet formed by such radial slits overlap the slits of the contiguous sheets to form a relatively tight yielding closure. The pressure of a package being inserted deflects the tongues of the several rubber closure sheets which conform closely to the contour of the package.

The package being gripped by the flexible diaphragm is forced therethrough by a second package which immediately takes the place of the first package thereby maintaining the magazine tube closed. The air within the magazine tubes being confined by the weighted closures of adjacent tubes and by such flexible filler closure and supported package at the top of the tube being filled, somewhat retards the falling package, easing its descent which tends to protect the deposited packages against injury.

For the purpose of minimizing frost deposits upon the package ejector mechanism, gaskets, collars or other bodies 78 of non-heat conductive material such as fiber, rubber, composition or the like are preferably, though not necessarily, interposed between the terminal portions 4' of the magazine tubes 4 through which the detent plates 34—35 operate and the contiguous main portions of the magazine tubes 4 and the brine tank 3, thus thermally insulating the package ejector mechanism from the refrigerating portion of the apparatus. While the ejector mechanism will become quite cold from the surrounding atmosphere, the exposed surfaces of the brine tank and the magazine tubes will be somewhat colder and hence receive the frost deposit rather than the ejector mechanism.

As a precautionary measure against the entrance of outside air into the refrigerating compartment, the moisture content of which would be deposited therein as frost, an auxiliary closure or curtain 79 is provided interiorly of the mechanically operated door 7 in the outlet 6 from the cold air chamber 2a. This closure is operable independently of the door 7 and is displaced by the weight of the released package in its movement through the outlet 6. It is preferably of rubber or other flexible material maintained under sufficient tension to cause it to automatically return to closing position after the passage of the package. However it may be of other material and may be gravity or spring operated. The purpose and action in any event is to close the passage 6 against the entrance of outside air quickly. It is not intended as a seal but only to retard air circulation during the time the door 7 is open.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

Having thus described my invention, I claim:

1. In a vending apparatus, a refrigerating compartment, a plurality of stationary vertical magazine tubes therein terminating at their lower ends above the bottom of the refrigerating compartment leaving therebelow a cold air space with which they communicate, closure means for hermetically sealing the top of said refrigerating compartment, a discharge chute common to all the magazine tubes leading downwardly from the said cold air space of the compartment and a closure door for the discharge chute and operating mechanism located outside the refrigerating compartment for controlling the release of articles from said magazine tubes.

2. In a vending machine, a refrigerating compartment, a plurality of vertically disposed stationary article magazines therein open at their opposite ends, closure means for the upper ends of the magazines, a discharge chamber common to the plurality of magazines with which the magazines communicate at their lower ends, a discharge outlet from the chamber, a closure for said outlet, means for automatically determining the sequence in which articles are to be discharged from particular magazines, detent means for normally retaining the articles to be dispensed within the magazines and releasing said articles singly in accordance with the automatic determination of the sequence determining means, and actuating means common to the outlet closure, the sequence determining means and the detent means for operating the same in sequence.

3. In a vending machine, a refrigerated chamber a plurality of magazine tubes therein arranged in pairs, detent means for retaining articles to be dispensed in the respective magazines, and automatic sequence determining means outside the refrigerated chamber and common to a plurality of pairs of tubes for operating the detent means to release articles to be dispensed from the respective magazines of each pair alternately with the release of articles from the magazines of another pair.

4. In a vending machine, a refrigerated chamber a group of magazines therein for articles to be dispensed subdivided into sections, detent means for retaining the articles therein and releasing the same singly, and automatic sequence determining means outside the refrigerated chamber and operatively connected with the detent and release means through the wall thereof for operating the detent means to release articles from magazines of different sections of the group in alternating succession.

5. In a vending machine, a refrigerated chamber a group of magazines therein for articles to be dispensed, detent means for retaining the articles therein and releasing the same singly, and automatic sequence determining means outside the refrigerated chamber and common to all the magazines of the group for operating the detent means to release articles from different magazines of the group in non-consecutive progression.

6. In a dispensing apparatus, a refrigerated chamber a plurality of magazines therein for articles to be dispensed arranged in pairs, detent means for retaining articles to be dispensed in the respective magazines and releasing the same singly, there being a detent and release means common to the magazines of each pair adapted to release articles therefrom alternately, and coin controlled mechanism located outside the refrigerated chamber and operatively connected with the detent and release means therein for alternately operating the detent and release means pertaining to different pairs of magazines.

7. In a dispensing apparatus, a plurality of magazines for articles to be dispensed, arranged in separate groups, manually operable group determining means for determining the group of magazines from which an article is to be dispensed controlled by the operator, and further sequence determining means for automatically determining the particular magazine of the selected group from which the article is to be dispensed independently of the operator independently operable dispensing means for each of the several groups of magazines, and common actuating means for the several independently operable dispensing means pertaining to the several groups of magazines for actuating them in accordance with the operator controlled determining means.

8. In a dispensing apparatus, a plurality of article magazines arranged in groups, a plurality of dispensing means pertaining thereto selective means for determining a group of magazines from any one of which an article is to be delivered, actuating means common to the dispensing means of all of the magazines for releasing articles therefrom, and automatic sequence determining means for releasing articles from different magazines of each group in predetermined succession independently of the release of articles from the magazines of a different group.

9. In a dispensing apparatus, a plurality of article magazines, a plurality of independently operable dispensing devices pertaining thereto, common actuating means for the plurality of dispensing devices operator selective means for determining collectively a series of such magazines from which a single article shall be dispensed, and independently operable sequence determining means for automatically determining the specific magazine of a selected series from which such article shall be dispensed.

10. In a dispensing apparatus, a plurality of article magazines, a common discharge outlet therefor, a closure for the outlet, detent means for retaining the articles in the magazines and releasing same singly, sequence determining means for determining the particular magazine of the plurality from which the article is to be released, an actuating motor common to the closure, detent means and sequence determining means for operating such mechanisms in predetermined succession, and means for setting said motor in operation.

11. In a dispensing apparatus, a plurality of article magazines, detent means for each magazine for retaining articles therein and releasing same singly, a rock shaft common thereto, detent operating means loosely mounted upon said shaft, actuating means for rocking the shaft, and coupling means by which a deposited coin will operatively couple the shaft with the detent and release means during its motion in one direction to release an article from one of said magazines, the movement of the shaft in opposite direction being independent of said detent and release means.

12. In a dispensing apparatus, a plurality of refrigerated magazines for articles to be dispensed, said magazines being hermetically sealed at their upper ends, a cold compartment below the magazines and common thereto with which the magazines communicate, and having a restricted discharge opening, a closure door for said discharge opening, means automatically determining the sequence in which articles are to be discharged from particular magazines, and actuating means operating the door in sequence therewith.

13. In a dispensing apparatus, a plurality of article magazines, a common discharge outlet for all of the magazines, a closure for the common outlet, detent means for releasing articles singly from the respective magazines, automatic sequence determining means for operating the detent means to release articles from different magazines in predetermined sequence, and actuating means common to the outlet closure, the detent means and the sequence determining means for operating said mechanisms in sequence.

14. In a dispensing apparatus, the combination with a storage compartment for articles to be dispensed, and article detent and release means, of a rock shaft, a rock arm of the shaft, discs loosely mounted on the shaft at opposite sides of the rock arm, and adapted to receive a bridging member with which the rock arm engages to actuate the discs in unison with the shaft during its rocking motion in one direction, the return motion of the shaft and arm being independent of the discs which are left in their advanced positions, operative connections between the discs and the article detent and release means, an actuating motor, and a control circuit therefor closed by the simultaneous engagement of the rock arm and discs with the bridging member, and a second contact in said circuit closed by the initial movement of the rock shaft and arm and maintaining the circuit closed until the shaft and arm approach their normal position at the limit of their return motion.

15. In a dispensing apparatus, the combination with a storage compartment, and article detent and release means, of a rock shaft, a rock arm carried thereby, a pair of discs loosely mounted upon the rock shaft on opposite sides of the rock arm, said discs having registering radial slots in their adjacent faces to receive a coupling piece to be engaged by the rock arm whereby the discs are advanced in unison with the rocking motion of the shaft, actuating means for the shaft, and operative connections between the respective discs and the article detent and release means.

16. In a dispensing apparatus, the combination with a storage compartment, and article detent and release means, of a rock shaft, a rock arm carried thereby, a pair of discs loosely mounted upon the rock shaft on opposite sides of the rock arm, said discs having registering radial slots in their adjacent faces to receive a coupling piece to be engaged by the rock arm, said slots and the face of the rock arm being disposed in slightly divergent intersecting planes whereby an inserted coupling piece will effect a wedging engagement with the discs and rock arm, said discs and rock arm being electrically isolated from each other, an actuating motor for the rock shaft, an electrical supply circuit therefor in which said discs and rock arm are included, said circuit being closed to actuate the motor by insertion of a coupling piece in said slots in contacting relation with the rock arm, and operative connections between the discs and the article detent and release means.

17. In an apparatus of the character described, a cold storage compartment open at its top, a closure for the top of the compartment, package storage means therein arranged in units, ejector mechanism for releasing the packages one by one, and an auxiliary closure for the compartment overlying the package storage means and divided into sections commensurate with different units of the package storage means, whereby each unit may be separately uncovered by removal of the corresponding auxiliary cover section.

18. In an apparatus of the character described, a cold storage compartment open at its top, a closure for the top of the compartment, package storage means therein arranged in units, ejector mechanism for releasing the packages one by one, and a condenser means divided into a plurality of separable sections one for each package storage unit disposed interiorly of the compartment and overlying the package storage means, said condenser member being subject to the cooling influence within the cold storage compartment and adapted to intercept and receive thereon condensation of moisture from air entering the top of the compartment before reaching the package storage means and ejector mechanism.

19. In an apparatus of the character described, a cold storage compartment, package storage means therein, ejector mechanism for progressively releasing packages therefrom, said compartment having a discharge orifice, and a closure door for the discharge orifice, and door actuating means operable to open the door, and auxiliary means for closing the door, said actuating means being disconnected from the door when the latter is in closed position at which time the door is under the influence of the auxiliary means only.

20. In an apparatus of the character described, a cold storage compartment, package storage means therein, ejector mechanism for progressively releasing packages therefrom, said compartment having a discharge orifice, a tensioned closure door therefor, yielding tension means therefor, an actuator for opening the door against its tension means, said actuator being operative to control the closing movement of the door under tension, said door being released from the influence of the said actuator when in its final closed position whereby the door is held under influence of said tension means only.

21. In an apparatus of the character described, a cold storage compartment operating at sub-freezing temperature, a plurality of package magazines having access openings at their tops for insertion of packages, package ejecting mechanism for releasing packages from the bottoms of the magazines, and closure means including a flexible marginal flange yieldingly engaging the tops of the magazines excluding air therefrom, and a condensing surface on said closure means, upon which frost is deposited by condensation of moisture.

22. In an apparatus of the character described, a cold storage compartment operable at sub-freezing temperature, a plurality of package magazines having separate access openings at their tops for insertion of packages, and intercommunicating one with another at their bottoms, package ejecting mechanism for releasing packages from the bottoms of the magazines, and means for retarding the accumulation of frost within the magazines including closure means preventing circulation of air through certain of the magazines while another of the magazines is open for filling.

23. In an apparatus of the character described, a cold storage compartment operable at sub-freezing temperature, a plurality of package magazines having separate access openings at their tops for insertion of packages, a chamber common to a plurality of the magazines through which the bottoms of the magazines communicate one with another, package ejecting mechanism for releasing packages from the bottoms of the magazines, and means for minimizing circulation of air through intercommunicating magazines while one of said magazines is being filled.

24. In an apparatus of the character described, a cold storage compartment, a plurality of package magazines having access openings at their tops for insertion of packages, individual closures for the plurality of magazines, each including a yielding self-sealing seat for minimizing the entrance of moisture to the magazines; package ejecting mechanism for releasing packages from the bottoms of the magazines, a closure for the compartment and means for retarding the accumulation of frost within the cold storage compartment including a condensing surface within the compartment intermediate the compartment closure and the closures of the magazines for deposit thereon of frost resulting from condensation of moisture entering the compartment.

25. In an apparatus of the character described, a cold storage compartment, a plurality of package magazines having access openings at their tops for insertion of packages, package ejecting mechanism for releasing packages from the bottoms of the magazines, weighted closure plug for the upper end of each magazine, a flexible sealing gasket upon the weight, engaging the top of the magazine upon which the weighted closure plug is suspended.

26. In an apparatus of the character described, a cold storage compartment, a plurality of package magazines having access openings at their tops for insertion of packages, package ejecting mechanism for releasing packages from the bottoms of the magazines, a closure for the upper end of each magazine comprising a metallic body suspended within the magazine, a flexible marginal flange carried thereby overhanging the upper end of the magazine walls upon which the metallic body is supported, there being a portion of the body exposed to atmosphere outside the magazine for condensation thereon of moisture entering the compartment.

27. In an apparatus of the character described, a cold storage compartment, a refrigerated package magazine therein, ejector mechanism for releasing successive packages from the magazine, and an insulating body of non-heat conductive material interposed between the ejector mechanism and the magazine for minimizing moisture condensation upon the ejector mechanism.

28. In a dispensing apparatus, dispensing mechanism for successively releasing packages to be dispensed, motor actuated driving means therefor, a pair of spaced members adapted to receive a bridging member, an electric actuating motor for the dispensing mechanism, an electric circuit therefor closed by said bridging member to place said motor in operation, said bridging member also serving to mechanically couple the motor operated driving means and the dispensing mechanism, said bridging member being dislodged from operative relation during the cycle of operation.

29. In a dispensing apparatus, dispensing mechanism for successively releasing packages to be dispensed, motor actuated driving means therefor, a pair of spaced members adapted to receive a bridging member, an electric actuating motor for the dispensing mechanism, an electric circuit therefor closed by said bridging member to place said motor in operation, said bridging member also serving to mechanically couple the motor operated driving means and the dispensing mechanism, and means to automatically eject the bridging member during the cycle of operation.

30. In a dispensing apparatus, dispensing mechanism for successively releasing packages to be dispensed, motor actuated driving means therefor, a pair of spaced members adapted to receive a bridging member, an electric actuating motor for the dispensing mechanism, an electric circuit therefor closed by said bridging member to place said motor in operation, said bridging member also serving to mechanically couple the motor operated driving means and the dispensing mechanism, means for maintaining the circuit closed independently of the bridging member during the cycle of operation after the initial closing thereof by the bridging member, said bridging member being subsequently dislodged from operative relation.

31. In a dispensing apparatus, dispensing mechanism for successively releasing packages to be dispensed, motor operated actuating means therefor including a pair of spaced members adapted to receive a bridging member, an electric actuating motor, an electric circuit closed by the bridging member for placing the motor in operation, and a motor operated driver engaging the bridging member for transmitting motion to the dispensing mechanism.

32. In a dispensing apparatus, a cold storage compartment, a package magazine therein, dispensing mechanism for releasing packages successively from the magazine, said storage compartment having an outlet orifice, independently operable inner and outer closures for the storage compartment adjacent to the outlet orifice, and means for simultaneously operating the dispensing mechanism and the outer closure, the inner closure being independently operated by the gravity impact of a discharged package in its course from the storage compartment to the outlet orifice.

33. In a dispensing apparatus, a cold storage compartment, a package magazine therein, dispensing mechanism for releasing packages successively from the magazine, said storage compartment having an outlet orifice, a closure therefor operated by the operation of the dispensing mechanism, and an additional closure therefor interposed between the first mentioned closure and the storage compartment and displaced by the discharged package subsequent to its release from the package magazine.

34. In a dispensing apparatus, a storage compartment, a plurality of magazine tubes therein to receive packages to be dispensed, package release mechanism, closure means therefor including a yielding closure for a tube being filled permitting the passage of successive packages into the tube but adapted to exclude outside air therefrom.

35. In a dispensing apparatus, a storage compartment, a plurality of magazine tubes therein to receive packages to be dispensed, said tubes having intercommunication one with another, package release mechanism, closure means for sealing certain of the tubes against the escape of air therefrom while another of the tubes is being replenished, whereby a back air pressure will be created within the magazine tubes by the descent of the packages in the magazine being filled to retard the descent of the inserted packages therein.

36. In a dispensing apparatus, a storage compartment, a plurality of package magazine tubes therein into which the packages to be dispensed are dropped, package release mechanism, and a yielding closure through which packages may be passed into a magazine tube for minimizing the escape of air from the magazine tubes during the deposit of packages therein.

37. In a dispensing apparatus, a storage compartment, a plurality of package magazine tubes therein into which the packages to be dispensed are dropped, package release mechanism, and a yielding diaphragm conforming to the shape of a package introduced therethrough into a magazine tube for minimizing the entrance of outside air into said magazine tubes during the deposit of packages therein.

38. In a dispensing apparatus, a storage compartment, a magazine tube therein to receive packages to be dispensed, package release mechanism, and a closure head for the magazine tube including a flexible slitted diaphragm through which the packages are inserted, said diaphragm being adapted to exclude outside air from the tube.

39. In a dispensing apparatus, a storage compartment, a magazine tube therein to receive packages to be dispensed, package release mechanism, and a closure head for the magazine tube including a flexible diaphragm comprising superposed layers of resilient material, said layers being split to permit the passage of packages therethrough, the splits of different layers being offset out of registry with each other.

40. In a dispensing apparatus, a storage compartment, a magazine tube therein to receive packages to be dispensed, package release mechanism, and a closure head for the magazine tube including supporting means for temporarily supporting one package in position to close the mouth of the tube until displaced into the tube by another package.

41. In a dispensing apparatus, a storage compartment, a magazine tube therein to receive packages to be dispensed, package release mechanism, and a closure head for the magazine tube including yielding sealing means conforming to the contour of a package during its passage therethrough and temporarily supporting an inserted package to close the mouth of the magazine tube.

42. In an apparatus for dispensing refrigerated articles, including a refrigerated storage compartment having a normally closed doorway through which the articles may be dispensed, ejector mechanism located at least in part within said compartment for dispensing the refrigerated articles through said doorway, a closure for said doorway, means to automatically operate said closure upon each article ejection cooling means normally maintaining the dew point of the atmosphere in said compartment lower than the temperature of the ejector mechanism the aforesaid cooling means including a refrigerating medium which is maintained substantially below 32° Fahrenheit, the aforesaid compartment including a condensing surface which is in direct heat interchanging contact with the aforesaid refrigerating medium to maintain its opposite surface at a lower temperature than the ejector mechanism, and means for thermally isolating the ejector mechanism from the condensing surface, so that frost deposits will be attracted to and deposited upon the relatively colder condensing surface and kept from being deposited upon the relatively warmer ejecting mechanism and so that the ejector mechanism operation will not be hindered by frost deposits.

43. In a dispensing apparatus, a refrigerated compartment having space for the storage of articles to be dispensed, dispensing means operative for releasing the articles therefrom at different laterally spaced release points for delivery therefrom to a single common delivery outlet, a delivery outlet at the bottom of the compartment common to a plurality of article release points, a cold air chamber located intermediate the article storage space and the delivery outlet, the side walls of said cold air chamber converging toward the delivery outlet, and a closure for said outlet.

44. In a dispensing apparatus, a storage compartment for packages to be dispensed having an opening through which packages may be deposited therein, dispensing mechanism for releasing deposited packages from the storage compartment, and an air lock closure removably engageable with the deposit opening of the storage compartment adapted to permit the entrance of packages into the compartment while minimizing the escape of air from the compartment during deposit of packages therein.

45. In an apparatus for dispensing refrigerated articles, a storage magazine for articles to be dispensed, a dispensing chamber through which articles are discharged from the magazine including a condensing surface having high heat conductivity characteristics exposed within the dispensing chamber for condensation of moisture thereon cooling means including refrigerating medium in direct contact with said condensing surface for chilling it below 32° F. so that the surface cools the dispensing chamber and also collects frost, said refrigerating medium also refrigerating the article storage magazine and article ejector mechanism within said dispensing compartment in thermally isolated relation with the condensing surface and normally maintained at a higher temperature than that of the condensing surface whereby condensation of moisture upon the ejector mechanism will be minimized.

46. In a vending apparatus for refrigerated articles, a thermally insulated housing, a refrigerated article storage compartment therein, terminating above the bottom of the housing, leaving therebelow a cold air space through which articles are discharged from the storage compartment to an exit opening, article releasing means within the cold air space for releasing articles from the storage compartment into said cold air space, and partitioning means including a condensing surface with means for maintaining the same at a lower temperature than contiguous portions of the apparatus including the article releasing means and to retard air circulation upwardly from the cold air space into the storage compartment and inducing thereon frost deposits resulting from incoming moisture ladened air within areas where frost deposits are unobjectionable and minimizing said deposit of frost in other locations.

47. In an apparatus for dispensing articles maintained at a temperature below thirty-two degrees Fahrenheit, which comprises a refrigerating chamber within and at the upper part of an insulated housing, multiple article storage passages extending through the refrigerating chamber from the top to the bottom thereof, a cold air storage reservoir within and at the bottom of the insulated housing forming a delivery chute below the refrigerating chamber with the reservoir top defined by the lower portion of the refrigerating chamber and by the articles within the aforesaid passages, said top retarding circulation of air from the cold air storage reservoir toward the top of the refrigerating chamber, to minimize frost deposit in said storage passages and to localize deposition upon the lower surface of the refrigerating chamber, a closure for the cold air reservoir and delivery chute, dispensing means controlling the delivery of the packages, and means controlling the dispensing means and the operation of said closure during package delivery.

48. In a dispensing apparatus for refrigerated packages, a thermally insulated housing within which temperatures below thirty two degrees Fahrenheit are maintained, a refrigerating compartment occupying the upper portion of the housing for containing a refrigerating medium, multiple package magazines extending therethrough from top to bottom, and accessible at their tops for insertion of packages and open at their bottoms for the discharge thereof, the refrigerating compartment and package magazines including common wall portions, a combination cold air reservoir and delivery chute within the housing beneath the refrigerating compartment with which the magazines commonly communicate at their bottoms, package releasing means within the cold air reservoir for delivery of packages from any of the magazines through the reservoir to a single exit opening, a closure for the exit opening, and operating mechanism located outside the thermally insulated housing for actuating the releasing means and closure, and individual closure means normally closing the magazines independently of each other at their tops to retard circulation of air within the magazines from one to another at their tops and to maintain a higher temperature in the cold air reservoir than in the magazines.

49. In a dispensing apparatus, a refrigerating chamber including a plurality of vertically disposed article magazines, a cold air chamber common thereto with which the magazines communicate at their lower ends, a downwardly extending outlet orifice from said chamber, a closure door therefor, article detent means operable to release articles singly from the magazines, sequence determining means common to a plurality of magazines for automatically determining the sequence in which articles are to be discharged therefrom, and actuating means for operating the closure door, the sequence determining means and the article detent selected by the sequence determining means in a predetermined cycle of operation.

50. In a dispensing apparatus, a plurality of stationary article magazines arranged in groups, a common discharge outlet therefor, a closure for the outlet, article detent means for releasing the articles singly from the separate magazines, means selectively controlled by the operator for determining the particular group of magazines fom one of which an article shall be discharged and sequence determining means for automatically selecting the particular magazine of the operator selected group from which the article shall be discharged and operating the means common to the closure door, the article detent means and said sequence determining means.

51. In an apparatus of the character described, a cold storage cabinet, a refrigerated compartment having package storage space located in the upper portion thereof, ejector mechanism for releasing the packages one by one from multiple relatively spaced stationary discharge positions in the article storage space, a restricted outlet orifice at the lowest level of the refrigerated compartment and a cold air reservoir below the level of the storage space through which the released packages pass from each of multiple stationary package release positions to the outlet orifice.

52. In a dispensing apparatus, a storage compartment, a plurality of magazine tubes therein into which the packages to be dispensed are dropped, said magazines communicating one with another at their lower ends and having filling openings at their tops, and closure means for the filling openings of intercommunicating magazine tubes other than that being filled for retarding the escape of air therefrom during the filling operation wherein a back pressure is created by descent of packages in the tube being filled to thereby cushion the descent of such packages.

SYDNEY W. WILLIAMSON.